United States Patent
Miller et al.

(10) Patent No.: US 11,494,502 B2
(45) Date of Patent: Nov. 8, 2022

(54) PRIVACY AWARENESS FOR PERSONAL ASSISTANT COMMUNICATIONS

(71) Applicant: MICROSOFT TECHNOLOGY LICENSING, LLC, Redmond, WA (US)

(72) Inventors: Adi L. Miller, Ramat Hasharon (IL); Roni Karassik, Ramat Gan (IL); Daniel Avigdor, Barkan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 731 days.

(21) Appl. No.: 16/170,557

(22) Filed: Oct. 25, 2018

(65) Prior Publication Data
US 2020/0134211 A1  Apr. 30, 2020

(51) Int. Cl.
*G06F 21/62* (2013.01)
(52) U.S. Cl.
CPC ................ *G06F 21/6209* (2013.01)
(58) Field of Classification Search
CPC ...... G06F 21/6209; G06F 21/32; G06F 21/30; G06F 21/42; H04W 12/63
See application file for complete search history.

(56) References Cited

U.S. PATENT DOCUMENTS

| | | | | |
|---|---|---|---|---|
| 5,493,692 A | * | 2/1996 | Theimer | H04L 51/20 455/26.1 |
| 8,621,645 B1 | * | 12/2013 | Spackman | G06F 21/84 726/26 |
| 9,152,809 B1 | * | 10/2015 | Greer | G06F 21/62 |
| 9,489,526 B1 | * | 11/2016 | Call | G06F 21/552 |
| 9,575,964 B2 | | 2/2017 | Yadgar et al. | |
| 10,701,067 B1 | * | 6/2020 | Ziraknejad | G06F 21/35 |
| 10,719,592 B1 | * | 7/2020 | Nichols | H04W 12/08 |
| 10,747,894 B1 | * | 8/2020 | Cline | G10L 15/22 |
| 11,017,115 B1 | * | 5/2021 | Young | G10L 25/48 |
| 2005/0138110 A1 | * | 6/2005 | Redlich | G06F 21/6209 709/201 |

(Continued)

FOREIGN PATENT DOCUMENTS

JP  2004302186 A  10/2004

OTHER PUBLICATIONS

"International Search Report and Written Opinion Issued in PCT Patent Application No. PCT/US2019/056416", dated Jan. 28, 2020, 12 Pages.

(Continued)

*Primary Examiner* — Ponnoreay Pich
(74) *Attorney, Agent, or Firm* — Shook, Hardy & Bacon L.L.P.

(57) ABSTRACT

Aspects of the technology described herein maintain the privacy of confidential information to be communicated to a user through a computing device. The technology keeps confidential information private by assessing the privacy context of the communication. The privacy context can be determined by determining a privacy level of the information to be communicated and the privacy level of the environment into which the information is to be communicated. The privacy context can be used to select an appropriate communication channel for the information. The privacy context can also be used to determine whether all available content is shared or just a portion of it.

20 Claims, 10 Drawing Sheets

(56) References Cited

U.S. PATENT DOCUMENTS

| | | | |
|---|---|---|---|
| 2006/0147000 A1* | 7/2006 | Novi | H04M 1/505 379/88.19 |
| 2006/0259790 A1* | 11/2006 | Asokan | H04L 9/0838 713/194 |
| 2014/0223553 A1* | 8/2014 | Gupta | G06F 21/577 726/22 |
| 2015/0149390 A1 | 5/2015 | Brdiczka et al. | |
| 2015/0382124 A1* | 12/2015 | Hall | H04S 7/303 381/300 |
| 2016/0044039 A1* | 2/2016 | Montanari | G06F 21/6218 726/27 |
| 2016/0342317 A1 | 11/2016 | Lim et al. | |
| 2017/0070539 A1 | 3/2017 | Sachs | |
| 2017/0199998 A1 | 7/2017 | Bruno et al. | |
| 2017/0330215 A1 | 11/2017 | Bruno et al. | |
| 2018/0048595 A1* | 2/2018 | Dotan-Cohen | H04L 51/08 |
| 2020/0117813 A1* | 4/2020 | Holland | G06F 21/604 |
| 2020/0134211 A1* | 4/2020 | Miller | H04W 12/02 |

OTHER PUBLICATIONS

Shoemaker, et al., "Single Display Privacyware: Augmenting Public Displays with Private Information", In Proceedings of SIGCHI Conference on Human Factors in Computing Systems, vol. 3, Issue 1, Mar. 31, 2001, pp. 522-529.

* cited by examiner

PRIVACY AWARENESS FOR PERSONAL ASSISTANT COMMUNICATIONS

CROSS REFERENCE TO RELATED APPLICATIONS

Background

Personal assistant applications are capable of communicating information to users through a variety of channels. For example, a personal assistant application can answer a user's question by outputting the answer through a speaker. Some of the information communicated by the personal assistant can be personal in nature. The user may wish to keep the confidential information private. A personal assistant that chooses to answer a question by outputting the answer through a speaker or putting it on a publicly viewable display device may inadvertently disclose confidential information to one or more people.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein maintain the privacy of confidential information to be communicated to a user through a computing device. The technology keeps confidential information private by assessing the privacy context of the communication. The privacy context can be determined by determining a privacy level of the information to be communicated and the privacy level of the environment into which the information is to be communicated. When the content is provided in response to a user request, then the content of the request can also be considered when determining the privacy level of the information to be communicated.

The privacy context can be used to select an appropriate communication channel for the information. Different communication channels have different probabilities of communicating information beyond the intended recipient. The appropriate communication channel is the communication channel that best matches the privacy context. For example, an answer provided by a virtual assistant through a speaker might be heard by anyone nearby. Accordingly, an audible output is appropriate for public information. An audible output could also be appropriate if the environment is known to be private. A private environment could include a room with only the intended recipient of a communication present.

The privacy context can also be used to determine whether all available content is shared or just a portion of it. For example, a user may ask a virtual personal assistant a question. The virtual personal assistant may retrieve an answer to that question, for example, from a calendar. The privacy context can then be determined before sharing the answer with the user. The answer could be modified to remove confidential information in certain privacy contexts. For example, the answer to the question, "what is my next appointment?" could be, "you have a doctor appointment at 2 o'clock." Mentioning a doctor's appointment may be considered confidential information. Accordingly, the answer could be modified to redact "doctor" if the answer is to be provided in a public environment. In other words, the answer provided in a public environment could be "you have an appointment at 2 o'clock." As an alternative, the user could be referred to a personal device such as a phone. In this case, the answer could be, "check your phone for details about your 2 o'clock appointment."

BRIEF DESCRIPTION OF THE DRAWINGS

Aspects of the invention are described in detail below with reference to the attached drawing figures, wherein.

DETAILED DESCRIPTION

Figure 1:
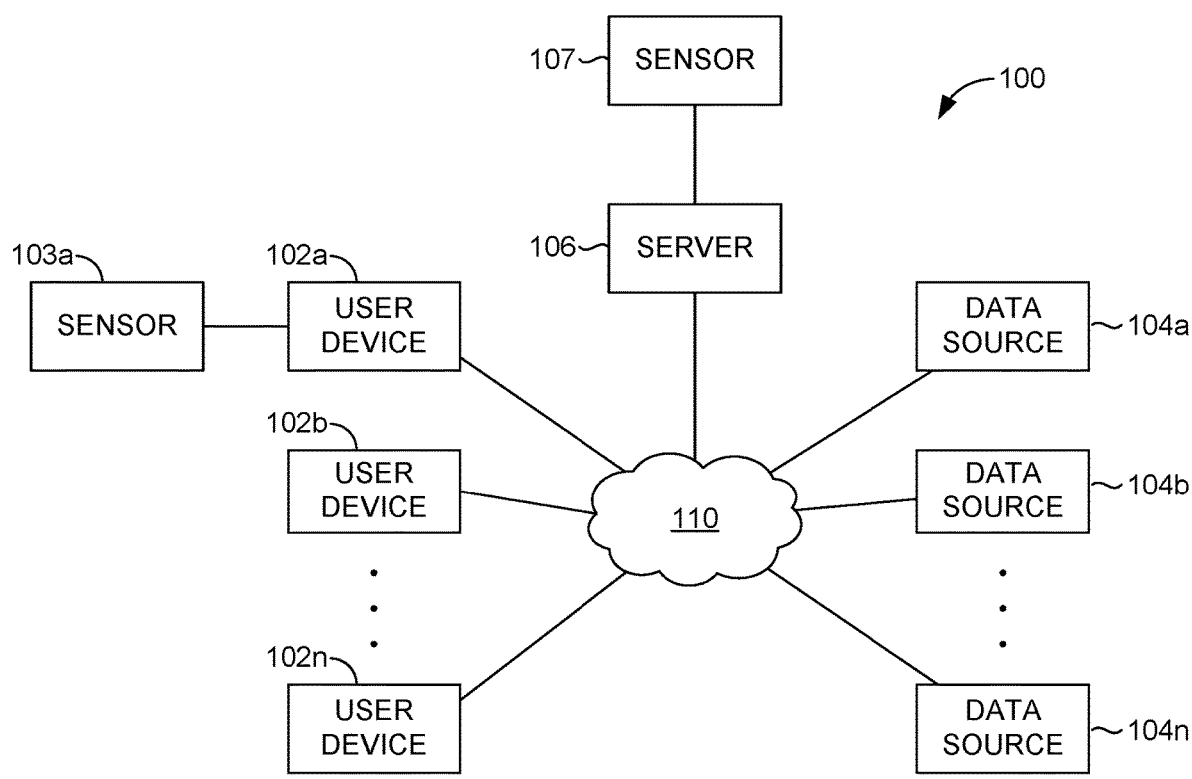
FIG. 1 is a block diagram of an example operating environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein maintain the privacy of confidential information to be communicated to a user through a computing device. The technology keeps confidential information private by assessing the privacy context of the communication. The privacy context can be determined by determining a privacy level of the information to be communicated and the privacy level of the environment into which the information is to be communicated. When the content is provided in response to a user request, then the content of the request can also be considered when determining the privacy level of the information to be communicated.

The privacy context can be used to select an appropriate communication channel for the information. Different communication channels have different probabilities of communicating information beyond the intended recipient. The appropriate communication channel is the communication channel that best matches the privacy context. For example, an answer provided by a virtual assistant through a speaker might be heard by anyone nearby. Accordingly, an audible output is appropriate for public information. An audible output could also be appropriate if the environment is known to be private or via a private audible device, such as headphones worn by a user. A private environment could include a room with only the intended recipient of a communication present. Similarly, information presented on a screen being projected into a conference room for shared with other users in a virtual meeting could be viewed by multiple people and may not be appropriate communication channel for private information. In contrast, information communicated on the screen of a phone, tablet, virtual reality headset, augmented reality headset, or a smart watch is unlikely to be viewed by people other than the recipient. These communication channels may be more appropriate for use in a private privacy context.

The privacy context can also be used to determine whether all available content is shared or just a portion of it. For example, a user may ask a virtual personal assistant a question. The virtual personal assistant may retrieve an answer to that question, for example, from a calendar. The privacy context can then be determined before sharing the answer with the user. The answer could be modified to remove confidential information in certain privacy contexts. For example, the answer to the question, "what is my next appointment?" could be, "you have a doctor appointment at 2 o'clock." Mentioning a doctor's appointment may be considered confidential information. Accordingly, the answer could be modified to redact "doctor" if the answer is to be provided in a public environment. In other words, the answer provided in a public environment could be "you have an appointment at 2 o'clock." As an alternative, the user could be referred to a personal device such as a phone. In this case, the answer could be, "check your phone for details about your 2 o'clock appointment." In one aspect, a confirmation is requested before answering. The answer could be, "Others may be able to hear the answer. Do you still want me to answer?"

The technology described herein can work with a single application or multiple applications. In one aspect, the technology can act as a gate keeper for multiple applications through a privacy broker. A privacy broker is a gatekeeper for communications originating at multiple sources, such as applications, operating system, or services. The privacy broker receives communications, evaluates them, and then takes action on the communications. Actions can include holding the communication, modifying the communication, outputting the communication to a different device, and presenting the communication. A communication broker may not handle all communication functions on a device. Some applications on a device may be able to generate and output communications without going through the communication broker.

The term "communication event" is used broadly herein to include actions taken (or not taken) by a user, application, or device in association with an electronic communication. The communication event can have a privacy context. Users can provide feedback whether the privacy sensitivity for a communication events was appropriate. A communication event associated with user feedback can be described as an annotated communication event. The annotated communication events can be used to train or retrain a machine learning system used to determine the privacy context of a communication.

The communication channel in a communication event can be audible, visible, haptic (e.g., vibration), or a combination of these and other communication channels. Communication refers to nearly any content received or initiated by a computing device associated with a user including attempted notifications (e.g., missed calls), notifications intended for the user, initiated on behalf of the user (e.g., task reminder), or available for the user. The notification may be for a reminder, task, announcement, or news item (including news relevant to the user such as local or regional news, weather, traffic, or social networking/social media information). Thus, by way of example and not limitation, communication events can be related to efforts to make the user aware of communications, including voice/video calls; email; SMS text messages; instant messages; notifications, social media or social networking news items or communications (e.g., tweets, Facebook posts or "likes," invitations, news feed items); news items relevant to the user; tasks that a user might address or respond to; RSS feed items; website and/or blog posts, comments, or updates; calendar events, reminders, or notifications; meeting requests or invitations; in-application communications including game notifications and messages, including those from other players; or the like. Some communication events may be associated with an entity (such as a contact or business, including in some instances the user himself or herself) or with a class of entities (such as close friends, work colleagues, boss, family, business establishments visited by the user, etc.). The communication can be associated with an entity through content of the communication. For example, a notification that an email has been received can be associated with the sender of the email as well as co-recipients of the email.

Additionally, some aspects of the technology may be carried out by a personal assistant application or service, which may be implemented as one or more computer applications, services, or routines, such as an app running on a mobile device or in the cloud, as further described herein.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 700, described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 7 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) user data to user-data collection component 214 of FIG. 2.) Data sources 104a and 104b through 104n may be discrete from user devices 102a and 102b through 102n and server 106 or may be incorporated and/or integrated into at least one of those components. In one aspect, one or more of data sources 104a through 104n comprises one or more sensors, which may be integrated into or associated with one or more of the user device(s) 102a, 102b, or 102n or server 106, or may be communicatively coupled to one or more of these devices, such as example sensors 103a and 107. Examples of sensed user data made available by data sources 104a through 104n are described further in connection to user-data collection component 214 of FIG. 2

Figure 2:
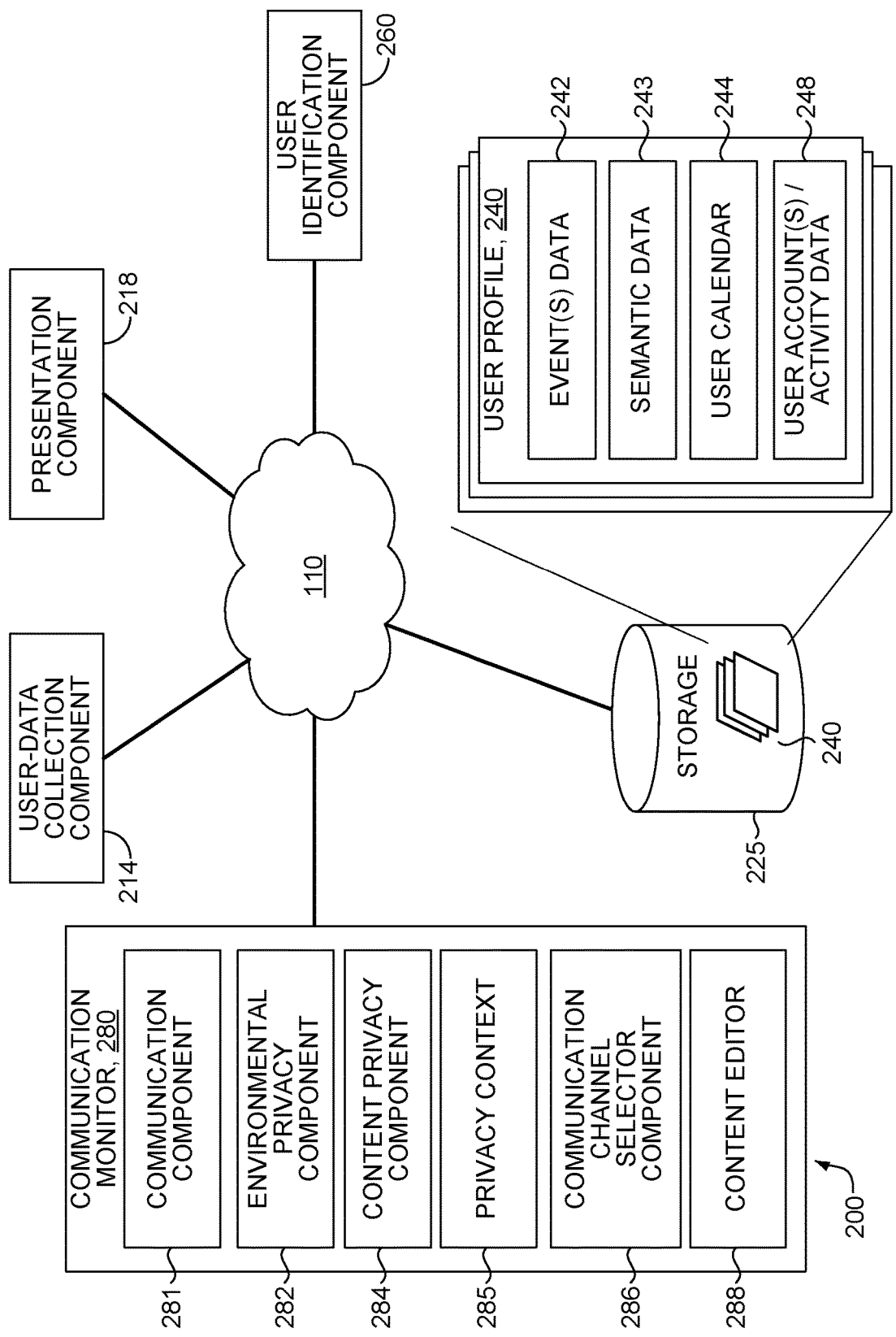
FIG. 2 is a diagram depicting an example computing architecture suitable for implementing aspects of the technology.

Operating environment 100 can be utilized to implement one or more of the components of system 200, described in FIG. 2, including components for collecting user data, monitoring communication events, generating modified responses, and/or presenting notifications and related content to users. Referring now to FIG. 2, with FIG. 1, a block diagram is provided showing aspects of an example computing system architecture suitable for implementing an aspect of the technology and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 214, communication monitor 280, user identification component 260, presentation component 218, and storage 225. Communication monitor 280 (including its components 281, 282, 284, 285, 286, and 288), user identification component 260, user-data collection component 214, and presentation component 218 may be embodied as a set of compiled computer instructions or functions, program modules, computer software services, or an arrangement of processes carried out on one or more computer systems, such as computing device 700 described in connection to FIG. 7, for example.

In one aspect, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 2, user-data collection component 214 is generally responsible for accessing or receiving (and in some cases also identifying) user data from one or more data sources, such as data sources 104a and 104b through 104n of FIG. 1. In some aspects, user-data collection component 214 may be employed to facilitate the accumulation of user data of one or more users (including crowdsourced data) for communication monitor 280 and user-identification component 260. The data may be received (or accessed), and optionally accumulated, reformatted, and/or combined, by data collection component 214 and stored in one or more data stores such as storage 225, where it may be available to communication monitor 280 and user-identification component 260. For example, the user data may be stored in or associated with a user profile 240, as described herein.

User data may be received from a variety of sources where the data may be available in a variety of formats. For example, in some aspects, user data received via user-data collection component 214 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. User data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user data associated with events; etc.) including user activity that occurs over more than one user device, user history, session logs, application data, contacts data, calendar and schedule data, notification data, social-network data, news (including popular or trending items on search engines or social networks), online gaming data, ecommerce activity (including data from online accounts such as Amazon.com®, eBay®, PayPal®, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein. In some respects, user data may be provided in user signals. A user signal can be a feed of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some aspects, user-data collection component 214 receives or accesses data continuously, periodically, or as needed.

Communication monitor 280 is generally responsible for monitoring communications, such as responses to a user query, calendar notifications, task reminders, text or email notifications, and related information in order to maintain the privacy of user information. For example, the communication monitor 280 may be part of a personal assistant application that monitors communications to be output from a personal assistant application. Alternatively, the communication monitor 280 may be a system function that monitors communications to be output by any of a number of applications. In particular, the communication monitor 280 may monitor communications that have a high risk of distributing information to multiple people beyond the intended audience for the communication. For example, the communication monitor 280 may monitor all audible communications from a computing system. Audible communications are at particular risk of being overheard by people nearby when output via a shared device. Similarly, visible communications on a shared screen may also be at risk of unintentionally sharing private information. For example, a calendar notification output on a screen being shared during an online meeting could reveal confidential or private information. The same is true if a screen is being projected into a conference room or other group setting. The communication monitor 280 can also determine whether a notification is to be displayed above a lock screen on a personal device based on the privacy determinations described herein.

As shown in example system 200, communication monitor 280 comprises a communication component 281, an environmental privacy component 282, a content privacy component 284, a privacy context component 285, a communication channel selector 286 and a content editor 288.

The communication component 281 receives the communication to be evaluated for privacy protection purposes. In addition to the communication, metadata associated with the communication may be received. For example, if the communication is in response to a request made by the user, then the request may also be provided to the communication component 281. The data source(s) from which information in the communication originated can be identified. For example, information in a communication could be from a user's calendar, task list, extracted from an email, a personnel file, the database, a public data store, a publicly available webpage, or some other data source. The data sources may be categorized as public or private. In addition, the identities of people that have access to a private data source may be provided. Knowing who has access to a data source can help the technology described herein assess the privacy-level of the environment. If information is to be broadcast into an environment where all the people present have access to the database from which the information originated, then the environment may be categorized as friendly.

The communication component 281 can send the communication and associated metadata to the environmental privacy component 282 and the content privacy component 284 for evaluation. In some instances, the communication component 281 may provide a modified communication to an application that provided the initial communication to be evaluated. The communication component 281 may also suggest a channel through which the communication should be provided. This information may be generated by the communication channel selector 286 and the content editor 288. In other words, the communication component 281 can serve as an intermediary between the communication monitor 280 and applications using the communication monitor 280. An application program interface maybe provided within the communication component 281 for this purpose.

The environmental privacy component 282, determines the environmental privacy level of the environment into which a communication is to be output. The environment can be defined as the area in which the communication may be received by a user. For example, the environment around a computer screen is the area in which the computer screen can be read and understood by a person. The environment for an audible communication is the area in which a person could hear the audible communication.

As an initial step, the environmental privacy component 282 may delineate the environment for an individual communication. For example, a pop-up notification in the lower corner of the computer screen with text and 10 point font may have an audience limited to someone located within five or 6 feet of the computer screen. A notification provided in 30 point font could have a much larger environment. Similarly, the volume on a speaker through which an audible communication is to be output can be used to define the environment for the audible communication. It should be noted, that the communication channel selector component 286 can select a communication channel other than the default. This could mean that a large notification is turned into a small notification on the same device. Similarly, the volume of an audible communication could be reduced to decrease the size of the environment. However, the initial step is to determine the environment for the communication based on the default or intended communication methods in place at the time of the evaluation.

In one aspect, the camera is used to evaluate and define the environment. For example, an image analysis may reveal that the computing device performing the analysis is in a room. Further analysis may reveal that the door to the room is open in the case of an audible communication. An open-door may cause the environmental area to be defined to include space outside of the room. This can have a significant impact on the environmental privacy level analysis. For example, the inability to evaluate whether people are present in the space outside of the room may cause the room to be defined as public if the communication is to be audible. In contrast, an open-door may not cause the area outside the door to be included in certain visible communications.

Having defined the area of the environment for a particular communication, the environmental privacy component 282 assigns a privacy level to the area. The environmental privacy level may be assigned by a machine learning method. Use of different machine learning-processes are possible in different aspects, including supervised learning processes (e.g., decision tree, random forest, logistic regression), unsupervised learning (e.g., apriori algorithm, K-means), or reinforcement learning. In each case, information about the environment is used as an input to determine the environmental privacy level. For example, if the user indicates that the environment is public under certain circumstances, then the environment can be classified as public under the same or similar circumstances in the future.

Various rules may be used to determine an input to the machine learning process were be used independently to calculate an environmental privacy level. For example, signal data may be analyzed to determine how many people are in the environment. If possible, each person in the environment may be identified through voice analysis, visual analysis, or through some other method. For example, when a meeting is scheduled to occur in a conference room the environmental privacy component 282 may assume that all invitees to the meeting are present.

The environmental privacy level may be classified as private, public, or friendly. A private environment only includes a single user associated with the personal computing device through which the communication is to be output. If the computing device is a shared device, such as a personal assistant device located in a conference room or common area, then the environment will be private only when the single person in the environment has been identified and is the addressee of the communication being evaluated.

The environmental privacy level be classified as public when one or more unknown people are present in the environment. The environmental privacy level may be classified as public when one or more people are present in the environment and are not known to have access to a data store from which information in the communication originated.

Environmental privacy level may be classified as friendly when all individuals in the environment are known and have access to the information in the communication. Each of these categories may be defined by a range of scores generated by a machine learning method or algorithm used to assess the environmental privacy level of an environment.

It should also be noted that a user input can be used to find environmental privacy level. For example, user settings could indicate that the environment is public or private. A personal assistant located in a conference room could be designated as in a public environment.

The virtual presence of others in the environment can be considered. For example, when the user is on a web meeting and sharing her screen then the environment can be considered public.

The content privacy component 284 assigns a content privacy level to a communication to be output to a user. The content privacy component 284 can perform natural language processing on the content of the communication. In addition, the content privacy component 284 can look at the source of the content. Content from a data store that is not publicly accessible may be given a higher privacy level. Other factors used can also be used to determine a privacy level, such as the reason for a communication. If the communication is in direct response to a request that includes a similar level of sensitive information, then the content in the response may be given a lower privacy level. For example, if the request to the personal assistant is, "what time is the budget meeting?" Then the user has indicated that "budget" is not sensitive or private in the current context.

The content privacy level may be assigned by a machine learning method. Use of different machine learning-processes are possible in different aspects, including supervised learning processes (e.g., decision tree, random forest, logistic regression), unsupervised learning (e.g., apriori algorithm, K-means), or reinforcement learning. In each case, information about the content is used as an input to determine the content privacy level. For example, a corpus of information may be manually scored or labeled along a privacy spectrum by people. A machine classification system trained on the corpus of labeled information could use natural language processing to assign a score along the same privacy spectrum to an unlabeled communication. In one aspect, feedback can be used to train the machine learning system. For example, if the user indicates that certain information is sensitive then it can be labeled as such going forward.

As an example of how the source of content can affect the privacy level, consider a communication about scarlet fever.

In isolation, natural language processing may flag a term like scarlet fever as related to a medical condition, which is often classified as private information. However, if the information about scarlet fever is retrieved from a medical database is publicly accessible than the information is less likely to be private. Similarly, if the information about scarlet fever is being provided in response to a question posed by a user about scarlet fever, then the response they be given even a lower privacy level. All of these factors can be considered in combination with each other to calculate the content privacy level.

The content privacy level may be assigned as public, sensitive, or private. In one aspect, content is public when it originates in public sources and is not found to include keywords or a combination of language that is classified as sensitive or private. In one aspect, content is sensitive when it originates in a private data source or is classified as sensitive through natural language processing or some other mechanism. In one aspect, content is private when it originates in a private data source or is classified as private through natural language processing or some other mechanism.

The privacy context 285 component combines the environmental privacy level and the content privacy level to arrive at an overall privacy context for the communication that dictates an action to be taken to preserve private information. In one aspect, the privacy context component uses the grid in Table 1 to assign one or more actions that preserve the privacy of content to be communicated.

TABLE 1

| PRIVACY CONTEXT | | | | |
|---|---|---|---|---|
| (Privacy | | Environmental Privacy Level | | |
| | Level) | Public (0) | Friendly (1) | Private (2) |
| Content Privacy Level | Public (0) | Openly provide requested info ($1^{st}$ channel) | Openly provide requested info ($1^{st}$ channel) | Openly provide requested info ($1^{st}$ channel) |
| | Sensitive (1) | Modify info OR Notify (provide info on $2^{nd}$ channel) | Modify info OR Openly provide requested info ($1^{st}$ channel) | Openly provide requested info ($1^{st}$ channel) |
| | Private (2) | Notify (provide info on $2^{nd}$ channel) | Notify (provide info on $2^{nd}$ channel) | Openly provide requested info ($1^{st}$ channel) |

As can be seen, the possible environmental privacy levels are shown on the grid with the possible content privacy levels. Each privacy level is assigned a value of zero, one, or two. These values are just one example and are not intended to be limiting. The intersection of the environmental privacy level and content privacy level is used to assign the privacy context of the communication and select an associated action if applicable. The overall context of a communication can be assigned a privacy context of secure, unsecure, or uncertain.

The secure privacy context is assigned when the environmental privacy score is larger than or equal to the privacy content score, unless both scores are in the middle category. For example, when the environmental privacy score is classified as private then the privacy context will always be secure as can be seen from the right hand column of table 1. The one exception to the case is when the environmental privacy level is friendly and the content privacy level is sensitive. In this case, the two scores are equal but the environment is classified as uncertain. The privacy context is also classified as secure when the content privacy level is public because the environmental score is equal to or greater than the content score. When the privacy context is secure then the communication should be output in full on its default communication channel.

The privacy context can be classified as insecure when the content privacy level is greater than the environmental privacy level. For example, when the privacy level of the content is private and the privacy level of the environment is public or friendly. When the privacy level is insecure, then a notification is provided that content can be found on alternate communication channel.

When the privacy context is uncertain then it defaults to private data and public environment, as described with reference to FIG. 3C.

The communication channel selector 286 assigns an appropriate communication channel based on the privacy context of the communication. Initially, the communication channel selector 286 may identify all available channels to communicate content to a user. The communication channel can include a modification to a default channel that will decrease the size of the environment to satisfy the privacy context. When possible, the environment may be decreased in size to include only the user. For example, the volume of an audible output could be decreased or the audible output may be shifted from a shared device to a private device, such as headphones worn by the user.

In one aspect, the alternative communication channel is through a different device than the original device through which the communication was planned. For example, a communication plan to go through a speaker on a personal assistant device could be rerouted to the user's phone or smart watch in order to maintain privacy. Different devices may be associated with a different privacy security level. Alternatively, an alternative communication channel may be reevaluated by the environmental privacy component 282 and the privacy context 285 to determine if further modification to the content is needed or whether a different channel should be selected. In one aspect, user preferences or behaviors are used to select the user's most used communication channel that environmental privacy score sufficient to output the communication. In other words, the most used alternative device with an environmental privacy score that is higher than the privacy score of the content may be selected.

A content editor 288 modifies content to redact sensitive information from a communication. The content editor 288 may identify sensitive information and generalize or remove it. For example, a meeting about a sensitive topic could be shortened to just a meeting with the time and location or just time if the location may be private. For example, located in a conference room may be less sensitive than a meeting in an office as the meeting in another person's office may give away the identity of at least one other participant in the meeting. In one aspect, a confirmation is requested before answering. The answer could be, "Others may be able to hear the answer. Do you still want me to answer?" In the meeting context, the response could be based on calendar information made available to others through a scheduling availability interface. In this case, the response could be, "you are busy from 2 to 4 today," or "you are in a meeting with five others from 2 to 4 today."

In some cases, the content editor 288 may provide a message indicating that the content can be accessed through an alternative communication channel, such as on the user's phone.

Example system 200 also includes a presentation component 218 that is generally responsible for presenting notifications and related content to a user, based on the notification content determined by notification broker 260. Presentation component 218 may comprise one or more applications or services on a user device, across multiple user devices, or in the cloud. For example, in one aspect, presentation component 218 manages the presentation of notification content to a user across multiple user devices associated with that user.

In some aspects, presentation component 218 generates user interface features associated with a notification. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

As described previously, in some aspects, a personal assistant service or application operating in conjunction with presentation component 218 determines when and how to present the notification. In such aspects, the notification content may be understood as a recommendation to the presentation component 218 (and/or personal assistant service or application) for when and how to present the notification, which may be overridden by the personal assistant application or presentation component 218.

Example system 200 also includes storage 225. Storage 225 generally stores information including data, computer instructions (e.g., software program instructions, routines, or services), and/or models used in aspects of the technology described herein. In an aspect, storage 225 comprises a data store (or computer data memory). Further, although depicted as a single data store component, storage 225 may be embodied as one or more data stores or may be in the cloud.

In an aspect, storage 225 stores one or more user profiles 240, an example aspect of which is illustratively provided in FIG. 2. Example user profile 240 may include information associated with a particular user or, in some instances, a category of users. As shown, user profile 240 includes event(s) data 242, semantic data 243, calendar data 244, and user account(s) data 248. The information stored in user profiles 240 may be available to the routines or other components of example system 200. The semantic data 243 can include information about the user, such as home address, family relations, work relations, and other profile information.

The user calendar can be used for a number of reasons. The calendar information can be from one or more user calendars, such as office calendars, personal calendars, social media calendars, or even calendars from family members or friends of the user, in some instances. Some aspects of the technology may construct a complementary or shadow calendar for a user for use in determining interaction probability. In particular, in such aspects, the complementary or shadow calendar may be used for determine who in a presentation environment has access to information being evaluated.

In an aspect, the complementary calendar may be constructed based upon sensor data associated with a user of a device. For example, a social network profile (e.g., social network posts, social network messages, a user profile indicating hobbies or interest of the users) may be evaluated to identify an activity of the user as a particular sensor data. In another example, a context of the user's device may be evaluated to identify an activity of the user as the sensor data (e.g., a device location may be indicative of the user going to soccer practice at a soccer field on Tuesdays; a device location check-in may be indicative of the user going out on a movie date on Sundays (e.g., the user may check-in through a social network); a connectivity state, such as Wi-Fi connectivity, may indicate that the user is at home, in the office, or at a coffee shop; a charging state, such as a car charging state, may indicate that the user is currently driving; a vacation itinerary file on the device may indicate that the user will be going on a vacation in a week).

In particular, user account(s) and activity data 248 can include data regarding user emails, texts, instant messages, calls, and other communications; social network accounts and data, such as news feeds; online activity; calendars, appointments, or other user data that may have relevance for determining unaddressed events; user availability; and importance, urgency, or notification logic. Aspects of user account(s) and activity data 248 may store information across one or more databases, knowledge graphs, or data structures. The account information may be used to access private information.

Figure 3A:
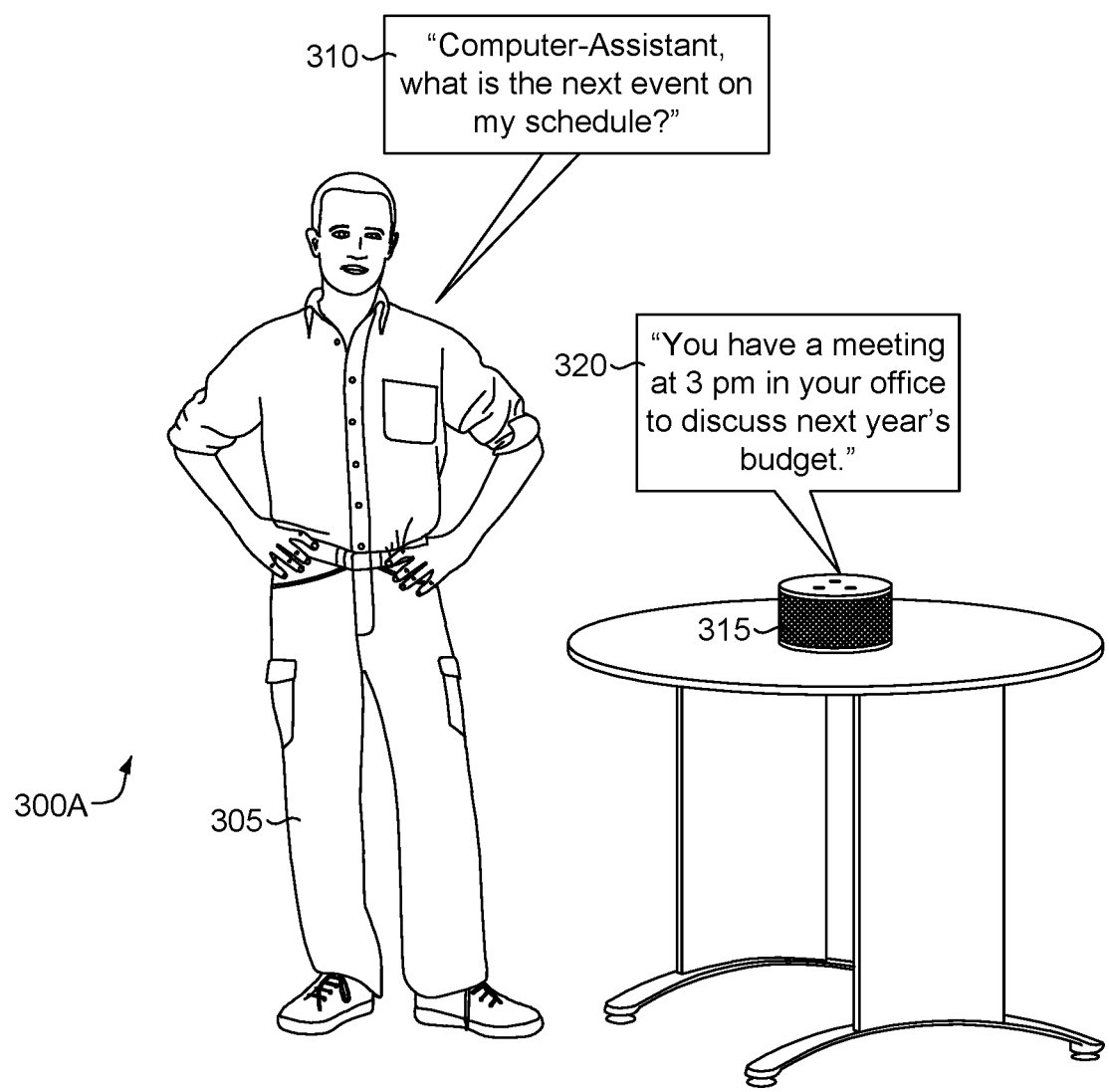
FIG. 3A depicts a personal assistant communicating sensitive information to a user in a private environment, in accordance with an aspect of the technology.

Turning now to FIG. 3A, a private communication environment 300A is depicted, in accordance with an aspect of the technology described herein. The communication environment 300A includes user 305 with no other people present. Accordingly, the communication environment 300A may be assigned a private privacy level. The user 305 asks the personal assistant 315 "computer-assistant, what is the next event on my schedule?" In this example, the personal assistant 315 takes the form of a speaker. Since the user 305 asks the personal assistant 315 an audible question, the default communication channel for the response is audible. The personal assistant 315 retrieves the answer from the user's schedule and determines a privacy level for the answer. In this case, the phrase "next year's budget" in the response can cause the response to be classified as either sensitive or private. The retrieval of the answer from a non-public data source (the user's calendar) also indicates the content is private or sensitive.

Next, the personal assistant 315 can evaluate the privacy-level of the environment. Many different types of signals can be used to determine the privacy-level of the environment including, visual analysis, audio analysis, signal analysis, contextual data, and user inputs.

A visual analysis of an environment can be performed by one or more cameras associated with the personal assistant 315. The camera may be associated with the personal assistant 315 directly or indirectly. A camera that is directly associated with the personal assistant 315 may be built into the personal assistant or otherwise connected to and controlled by the personal assistant 315. An indirectly controlled camera could be one associated with a laptop, phone, or other device that may provide visual data, such as a video, images, a 3-D point cloud, to the personal assistant 315. The personal assistant 315 may process the visual data to determine whether a person other than the user is present in the environment. The camera could also be used to determine whether a door leading into a room constituting the environment is open. When an open-door is noted, the environment may be classified as public in certain instances, such as when the personal assistant 315 is located in an office environment, in contrast to a home.

Like visual data, audio data may be collected by a microphone that is directly or indirectly associated with the personal assistant 315. The audio data may be analyzed to determine whether people other than the user are located in the environment. For example, the voices of one or more other people could be detected in the audio signals. In addition to detecting that an additional person is present, the signal could be used to identify a voice and by extension the identity of the other person in the environment.

Electronic signal analysis can also be performed to determine whether an environment includes multiple people. Many people carry electronic devices such as smart phones, smart watches, personal computers, tablets, and such with them. These devices often transmit wireless signals. These wireless signals can be captured by the personal assistant 315 and analyzed to determine proximity to the personal assistant 315.

In one aspect, a user input can be used to establish the privacy-level of the environment. A user may indicate during set up or some other time that the personal assistant 315 is located in a public setting. For example, a personal assistant 315 located in a conference room or common area in an office may be designated by a user as public. This type of device may be a shared device that receives commands and requests from multiple users. As mentioned, a shared device may use different mechanisms to identify an individual user, such as voice analysis, facial recognition, or other biometric methods. If the device settings indicate that the device is in a public location, then the environmental privacy level may always resolve to a public designation. In another aspect, the device was such a setting may have a default of a public location but can use other signal data to determine that a user is alone in the environment. For example, an audio or visual analysis of the environment could indicate that the user is alone in the environment.

In this example, the privacy level for the environment was determined to be private. Having made this determination, the personal assistant 315 provides an unmodified response 320 to the user 305. In this case, the response 320 states, "you have a meeting at 3 PM in your office to discuss next year's budget."

Figure 3B:
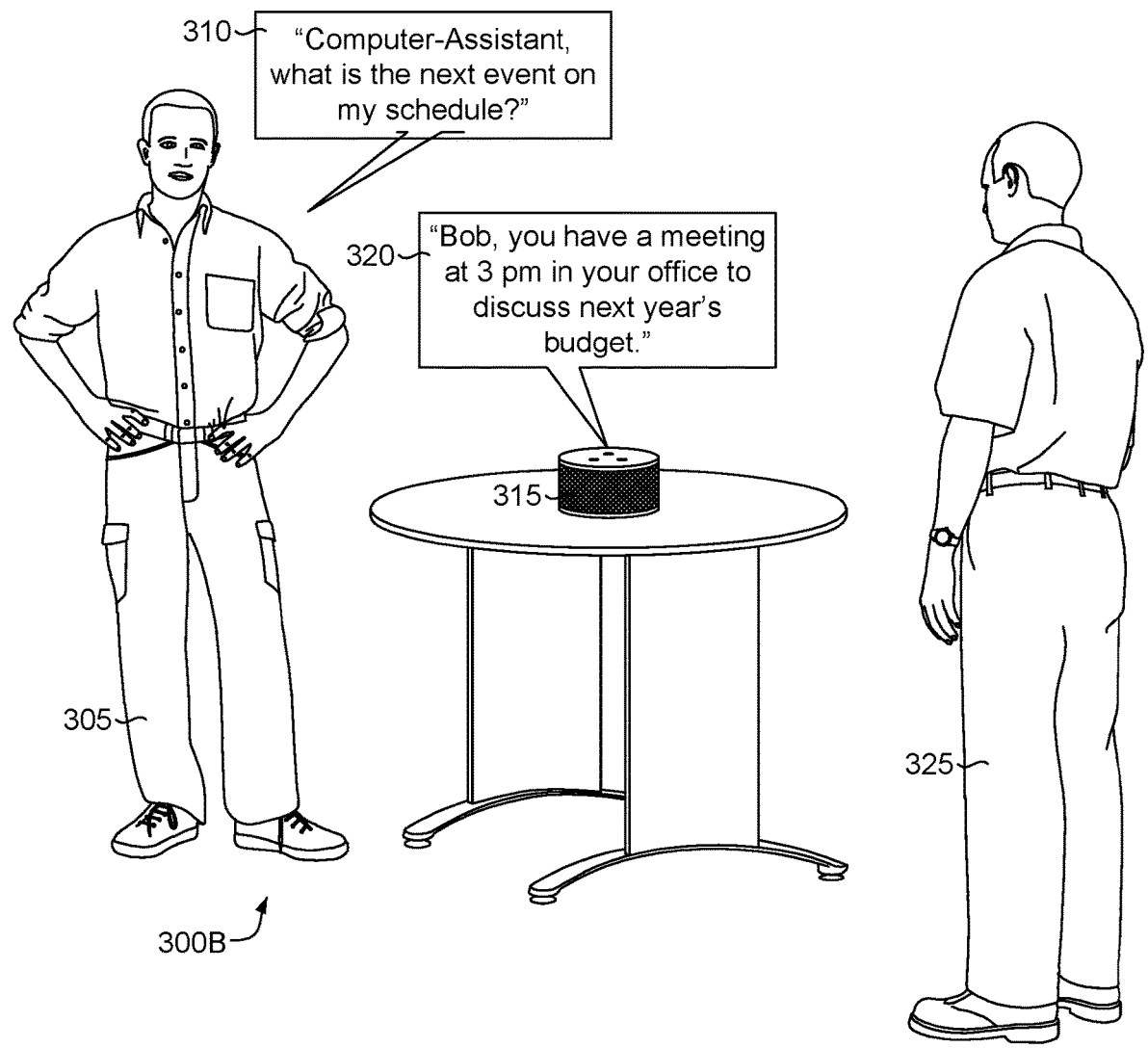
FIG. 3B depicts a personal assistant communicating sensitive information to a user in a friendly environment, in accordance with an aspect of the technology.

Turning now to FIG. 3B, a friendly communication environment 300A is depicted, in accordance with an aspect of the technology described herein. The communication environment 300A includes user 305 with a second user 325. The user 305 asks the personal assistant 315 "computer-assistant, what is the next event on my schedule?" In this example, the personal assistant 315 takes the form of a speaker. Since the user 305 asks the personal assistant 315 an audible question, the default communication channel for the response is audible. The personal assistant 315 retrieves the answer from the user's schedule and determines a privacy level for the answer. In this case, the phrase "next year's budget" can cause the response to be classified as either sensitive or private. The retrieval of the answer from a non-public data source (the user's calendar) also indicates the content is private or sensitive.

Next, the personal assistant 315 can evaluate the privacy-level of the environment. Many different types of signals can be used to determine the privacy-level of the environment including, visual analysis, audio analysis, signal analysis, contextual data, and user inputs. In this case, the personal assistant 315 determines that the second user 325 is present in the room. However, the identity of the second user 325 may be used to further classify the privacy level of the environment. In particular, if the second user 325 has access to the same data source from which the answer was taken, then the environmental privacy label may be set as friendly or even private. In this scenario, the second user 325 is determined to on the invite to the 3 PM meeting. In this example, the potentially sensitive information in the response is already known to the second user 325. This illustrates, that the privacy level of an environment could be different depending on the content of information to be communicated even when exactly the same people are located in the environment.

A privacy level of the environment can be compared to the privacy level of the content to select a communication channel and modification strategy. In this case, a sensitive content privacy level could be compared to a friendly environmental privacy level. In this case, no modification is needed because the privacy level of the environment equals or exceeds the privacy level of the content. Additionally, the default audible communication channel may be used. As with the first example, the personal assistant 315 provides an unmodified response 320 stating, "Bob, you have a meeting at 3 PM in your office to discuss next year's budget."

Figure 3C:
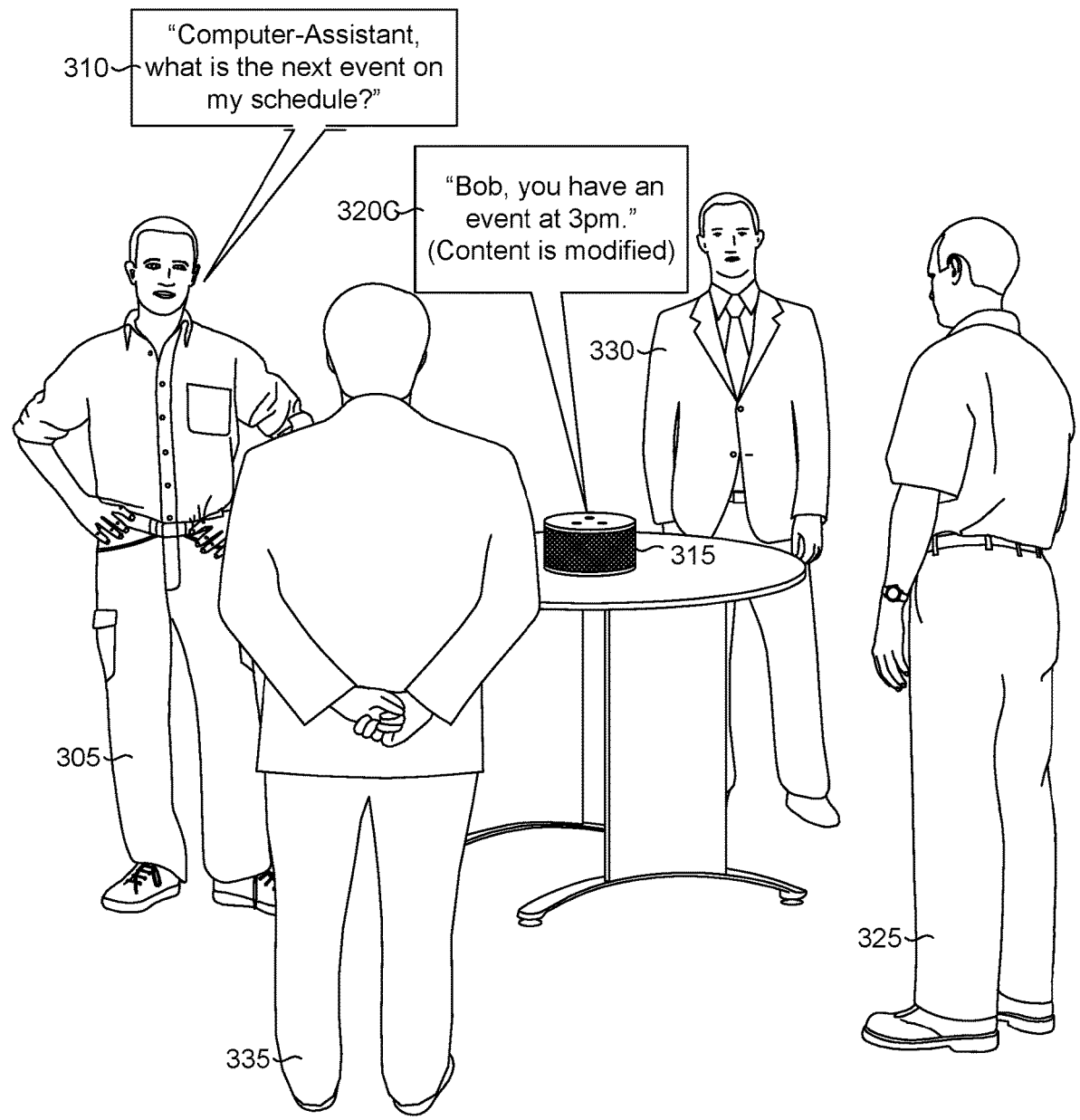
FIG. 3C depicts a personal assistant communicating sensitive information to a user in a public environment using modified content, in accordance with an aspect of the technology.

Turning now to FIG. 3C, a public communication environment 300A is depicted, in accordance with an aspect of the technology described herein. The communication environment 300A includes user 305 with a second user 325, third user 330 and fourth user 335. The user 305 asks the personal assistant 315 "computer-assistant, what is the next event on my schedule?" In this example, the personal assistant 315 takes the form of a speaker. Since the user 305 asks the personal assistant 315 an audible question, the default communication channel for the response is audible. The personal assistant 315 retrieves the answer from the user's schedule and determines a privacy level for the answer. In this case, the phrase "next year's budget" (as shown in FIGS. 3A and 3B) can cause the response to be classified as either sensitive or private. The retrieval of the answer from a non-public data source (the user's calendar) also indicates the content is private or sensitive.

Next, the personal assistant 315 can evaluate the privacy-level of the environment. Many different types of signals can be used to determine the privacy-level of the environment including, visual analysis, audio analysis, signal analysis, contextual data, and user inputs. In this case, the personal assistant 315 determines that the second user 325, third user 330, and fourth user 335 are present in the room. In this example, one or more of the other users do not have access to the meeting information and the environmental-privacy is determined to be public.

A privacy level of the environment can be compared to the privacy level of the content to select a communication channel and modification strategy. In this case, a sensitive content privacy level could be compared to a public environmental privacy level. In this case, modification is needed because the privacy level of the environment is less than the privacy level of the content. Nevertheless, the default audible communication channel may be used. The personal assistant 315 provides a modified response 320 stating, "Bob, you have a meeting at 3 PM."

Figure 3D:
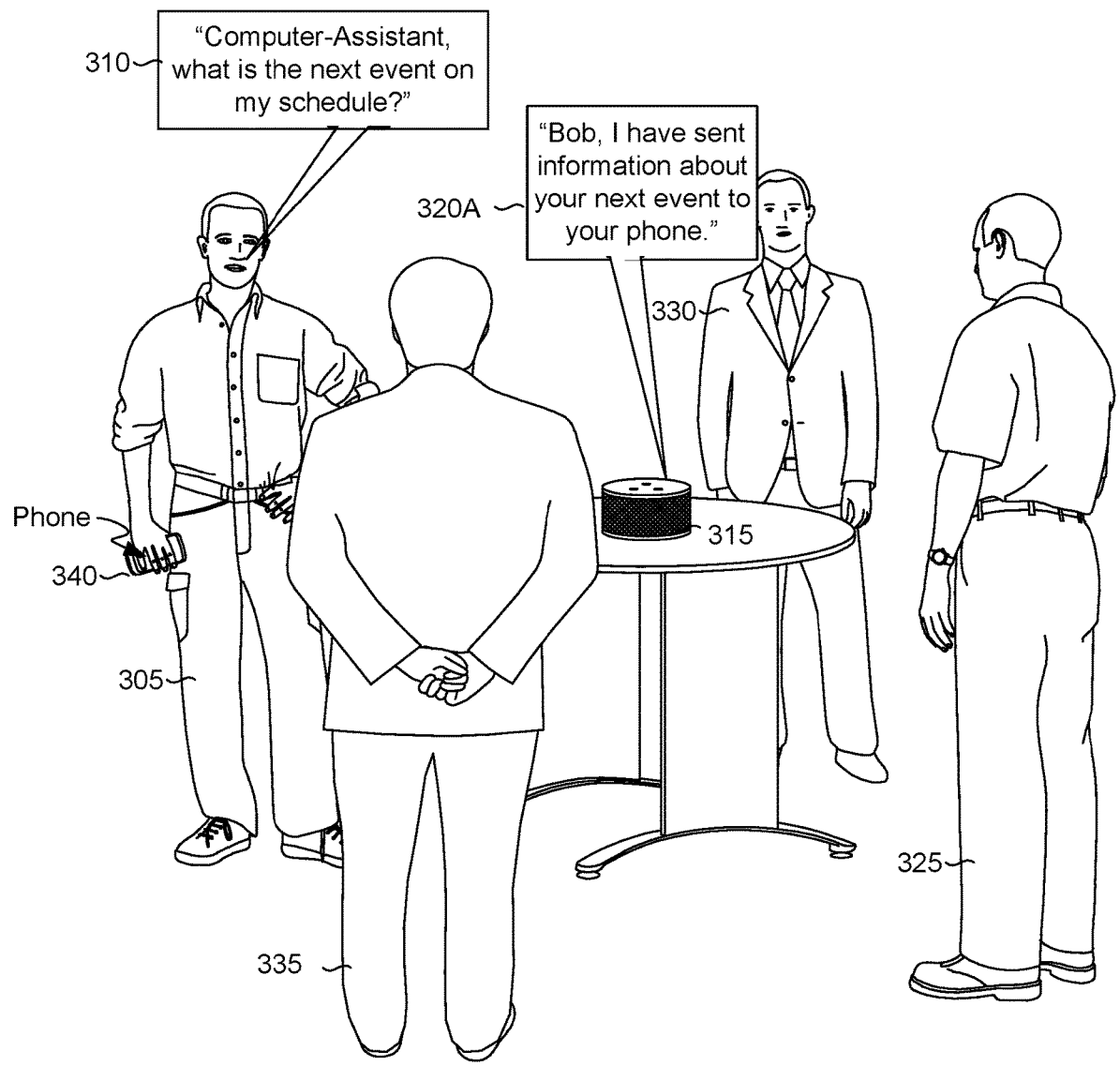
FIG. 3D depicts a personal assistant communicating sensitive information to a user in a public environment using alternative communication channel, in accordance with an aspect of the technology.

Turning now to FIG. 3D, a public communication environment 300A is depicted, in accordance with an aspect of the technology described herein. The communication environment 300A includes user 305 with a second user 325, third user 330 and fourth user 335. The user 305 asks the personal assistant 315 "computer-assistant, what is the next event on my schedule?" In this example, the personal assistant 315 takes the form of a speaker. Since the user 305 asks the personal assistant 315 an audible question, the default communication channel for the response is audible. The personal assistant 315 retrieves the answer from the user's schedule and determines a privacy level for the answer. In this case, the phrase "next year's budget" (as shown in FIGS. 3A and 3B) can cause the response to be classified as either sensitive or private. The retrieval of the answer from a non-public data source (the user's calendar) also indicates the content is private or sensitive.

Next, the personal assistant 315 can evaluate the privacy-level of the environment. Many different types of signals can be used to determine the privacy-level of the environment including, visual analysis, audio analysis, signal analysis, contextual data, and user inputs. In this case, the personal assistant 315 determines that the second user 325, third user 330, and fourth user 335 are present in the room. In this example, one or more of the other users do not have access to the meeting information and the environmental-privacy is determined to be public.

A privacy level of the environment can be compared to the privacy level of the content to select a communication channel and modification strategy. In this case, a sensitive content privacy level could be compared to a public environmental privacy level. In this case, modification is needed because the privacy level of the environment is less than the privacy level of the content. A modified response can be provided on the default audible communication channel may be used and additional information can be sent to the user's phone 340. The personal assistant 315 provides a modified response 320 stating, "Bob, I have sent information about your next event to your phone." At the same time, the meeting details can be provided to the phone 340, which allows the user 305 to view the details without the other users receiving the information.

Figure 4:
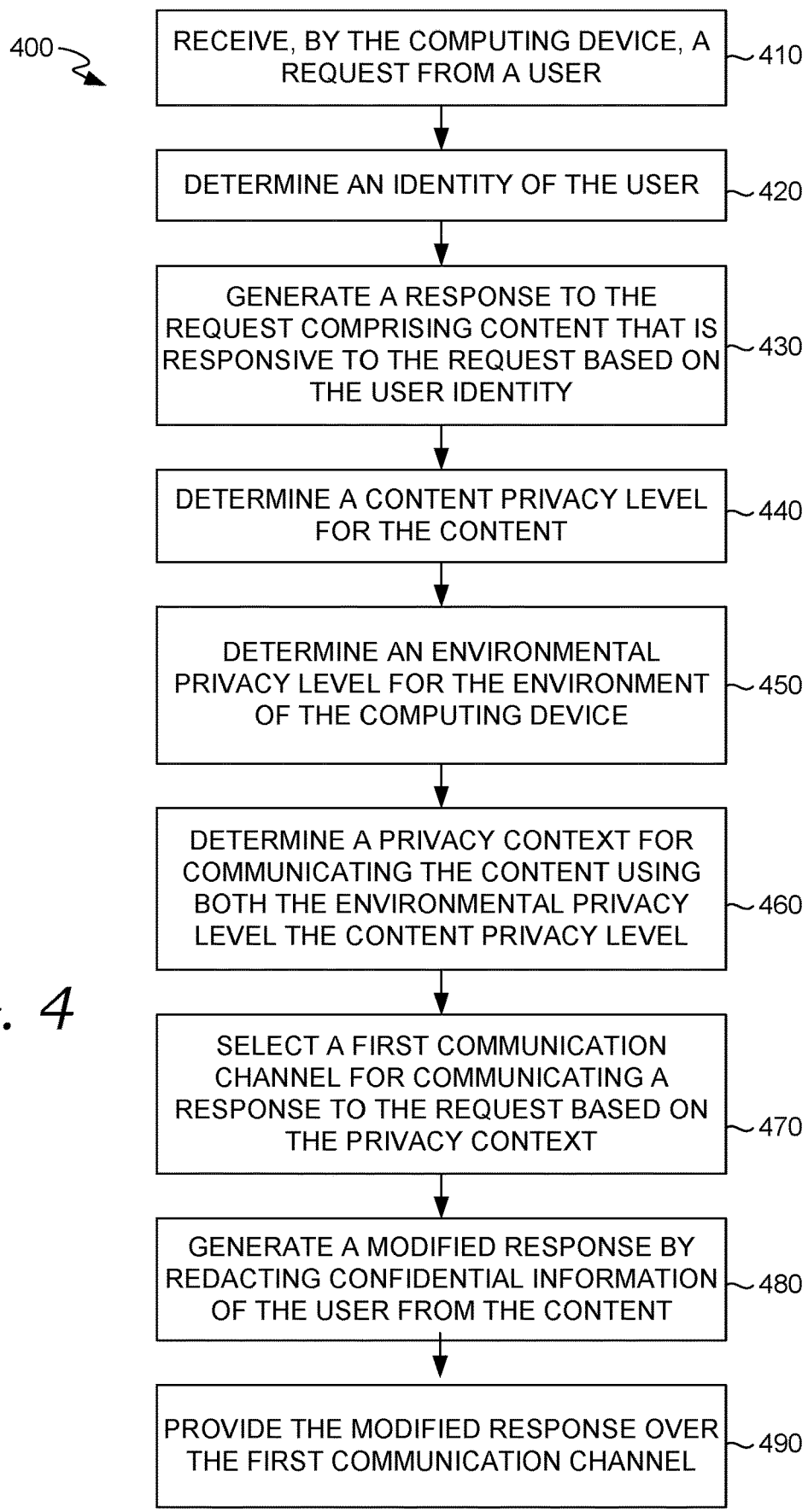
FIGS. 4-6 depict flow diagrams of methods for preserving privacy of information provided from a computing device, in accordance with an aspect of the technology.

Turning now to FIG. 4, flow chart showing a method 400 for preserving privacy of information output from a computing device located in an environment is provided. Method 400 could be performed by personal assistant application.

At step 410, a request from a user is receiving by the computing device. The request could be a question poised to a voice-enabled personal assistant computing application. The request could also be typed or provided via some other mechanism. For example, the user could ask a computing device, "what is the weather at home currently?" The personal assistant may output a response through a speaker or display screen integrated with the computing device or communicatively coupled to the device.

At step 420, an identity of the user is determined. The user may be identified through a series of different methods. For example, the user could be identified through account information if the user logged into the computing device (or the computing device, such as a smart speaker, is operating in a user-account mode or a session associated with the user) or another personal computing device such as a laptop computer or phone. Biometric information, such as the user's voice, fingerprint, visual attribute (e.g., facial recognition) which may be determined by a camera or other sensor 103a or ao7a, also be used to identify the user.

At step 430, a response to the request is generated based on the identity of the user. The response comprises a content that is responsive to the request. A personal assistant application may retrieve information that is responsive to the request and arrange it in a response. In this case, the user's identity may be needed to retrieve the information. In the question posed above, the user asks about weather at his home. The user's identity is needed to determine where the user's home is and then retrieve the weather. In another example, the user's identity may be needed to access the appropriate calendar or other data store in order to answer the question. In some cases, user account information is used to access the information is responsive to the request. For example, a user account(s)/activity data 248 in user profile 240 (described in FIG. 2) may be accessed to facilitate receiving content in response to the user request at step 410.

At step 440, a content privacy level for the content is determined. Determining a content privacy level has been described previously with reference to FIG. 2. The content privacy level may be assigned as public, sensitive, or private. In one aspect, content is public when it originates in public sources and is not found to include keywords or a combination of language that is classified as sensitive or private. In one aspect, content is sensitive when it originates in a private data source or is classified as sensitive through natural language processing or some other mechanism. In one aspect, content is private when it originates in a private data source or is classified as private through natural language processing or some other mechanism.

At step 450, an environmental privacy level for the environment of the computing device is determined. The environmental privacy level may be assigned by a machine learning method. Use of different machine learning-processes are possible in different aspects, including supervised learning processes (e.g., decision tree, random forest, logistic regression), unsupervised learning (e.g., apriori algorithm, K-means), or reinforcement learning. In each case, information about the environment is used as an input to determine the environmental privacy level.

Various rules may be used to determine an input to the machine learning process were be used independently to calculate an environmental privacy level. For example, signal data may be analyzed to determine how many people are in the environment. If possible, each person in the environment may be identified through voice analysis, visual analysis, or through some other method. For example, when a meeting is scheduled to occur in a conference room the environmental privacy component 282 may assume that all invitees to the meeting are present.

The environmental privacy level may be classified as private, public, or friendly. A private environment only includes a single user associated with the personal computing device through which the communication is to be output. If the computing device is a shared device, such as a personal assistant device located in a conference room or common area, then the environment will be private only when the single person in the environment has been identified and is the addressee of the communication being evaluated.

The environmental privacy level be classified as public when one or more unknown people are present in the environment. The environmental privacy level may be classified as public when one or more people are present in the environment and are not known to have access to a data store from which information in the communication originated. The environment can be both physical and virtual. For example, when a computing device is connected to video conference then the other people participating on the video conference may be in the environment because they could hear an audible response or perhaps see a visual response presented on the screen, especially if the screen is being shared.

Environmental privacy level may be classified as friendly when all individuals in the environment are known and have access to the information in the communication. Each of these categories may be defined by a range of scores generated by a machine learning method or algorithm used to assess the environmental privacy level of an environment.

It should also be noted that a user input can be used to find environmental privacy level. For example, user settings could indicate that the environment is public or private. A personal assistant located in a conference room could be designated as in a public environment.

At step 460, a privacy context for communicating the content is determined using both the environmental privacy level the content privacy level. The overall context of a communication can be assigned a privacy context of secure, unsecure, or uncertain.

The secure privacy context is assigned when the environmental privacy score is larger than or equal to the privacy content score, unless both scores are in the middle category. For example, when the environmental privacy score is classified as private then the privacy context will always be secure as can be seen from the right hand column of table 1. The one exception to the case is when the environmental privacy level is friendly and the content privacy level is sensitive. In this case, the two scores are equal but the environment is classified as uncertain. The privacy context is also classified as secure when the content privacy level is public because the environmental score is equal to or greater than the content score. When the privacy context is secure then the communication should be output in full on its default communication channel.

The privacy context can be classified as insecure when the content privacy level is greater than the environmental privacy level. For example, when the privacy level of the content is private and the privacy level of the environment is public or friendly. When the privacy level is insecure, then a notification is provided that content can be found on alternate communication channel.

When the privacy context is uncertain then the content is modified to remove sensitive content, as described with reference to FIG. 3C.

At step 470, a first communication channel is selected for communicating the response to the request based on the privacy context. In one aspect, the environmental privacy level associated with the communication channel must be greater than or equal to the privacy level of the content.

At step 480, a modified response is generated, such as by redacting confidential information from the content or by generalizing information included in the content. A modified response can be generated by natural language processing, keyword matching, or some other process that identifies sensitive information. The sensitive information could be deleted or replaced with a generic term. For example, you have a medical check-up could be replaced by content indicating "you have an out-of-office appointment," or merely by content indicating "you have an appointment." In the meeting context, the response could be based on calendar information made available to others through a meeting availability interface. In this case, the response could be, "you are busy from 2 to 4 today," or "you are in a meeting with five others from 2 to 4 today." In one aspect, the modified response is a question seeking confirmation, such as, "Other people may be present, do you still want me to answer?"

At step 490, the modified response is provided over the first communication channel.

Figure 5:
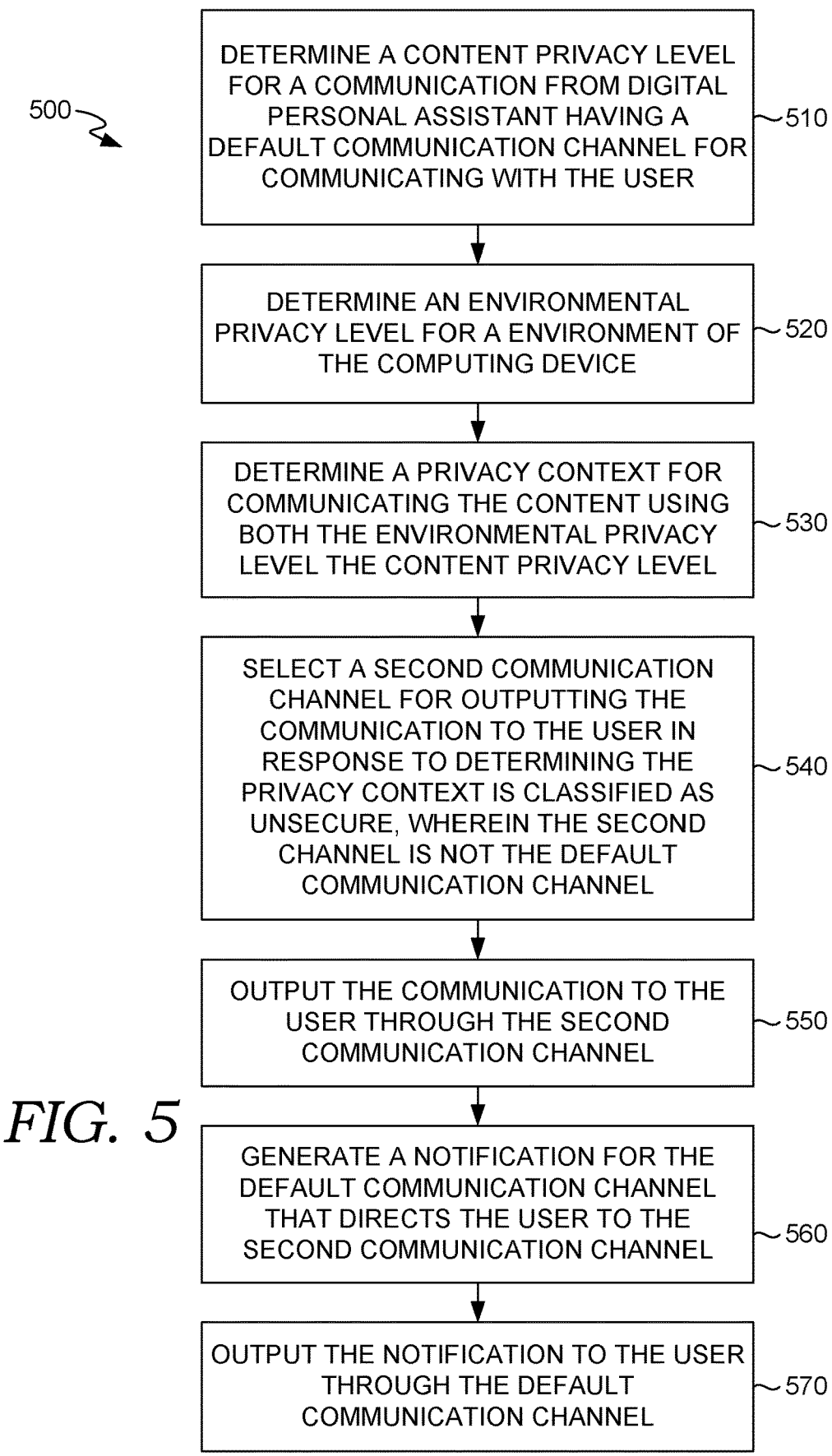

Turning now to FIG. 5, flow chart showing a method 500 for preserving privacy of information output from a computing device located in an environment is provided.

At step 510, a content privacy level is determined for a communication to be communicated from digital assistant having a default communication channel to communicate with the user. An example of a default communication channel for the communication is a speaker integrated with or communicatively coupled to the computing device. Another example of a default communication channel for the communication is a display screen integrated with or communicatively coupled to the computing device. The default communication channel may change with context. For example, the speaker may be the default communication channel used in response to a spoken question. The display screen could be the default communication channel when the user types a question. Embodiments for determining a content privacy level have been described previously with reference to FIG. 2. In an embodiment, the content privacy level may be assigned as public, sensitive, or private. In another embodiment, the privacy level may be assigned a level or degree (such as a number from 1 to 10 indicating a degree of privacy.) In one aspect, content is public when it originates in public sources and is not found to include keywords or a combination of language that is classified as sensitive or private. In one aspect, content is sensitive when it originates in a private data source or is classified as sensitive through natural language processing or some other mechanism. In one aspect, content is private when it originates in a private data source or is classified as private through natural language processing or some other mechanism.

At step 520, an environmental privacy level for the environment of the computing device is determined. The environmental privacy level may be assigned by a machine learning method. Use of different machine learning-processes are possible in different aspects, including supervised learning processes (e.g., decision tree, random forest, logistic regression), unsupervised learning (e.g., apriori algorithm, K-means), or reinforcement learning. In each case, information about the environment is used as an input to determine the environmental privacy level.

Various rules may be used to determine an input to the machine learning process were be used independently to calculate an environmental privacy level. For example, signal data may be analyzed to determine how many people are in the environment. If possible, each person in the environment may be identified through voice analysis, visual analysis, or through some other method. For example, when a meeting is scheduled to occur in a conference room the environmental privacy component 282 may assume that all invitees to the meeting are present.

The environmental privacy level may be classified as private, public, or friendly. A private environment only includes a single user associated with the personal computing device through which the communication is to be output. If the computing device is a shared device, such as a personal assistant device located in a conference room or common area, then the environment will be private only when the single person in the environment has been identified and is the addressee of the communication being evaluated. The environment can be both physical and virtual. For example, when a computing device is connected to video conference then the other people participating on the video conference may be in the environment because they could hear an audible response and perhaps see a response presented on the screen, especially if the screen is being shared.

The environmental privacy level be classified as public when one or more unknown people are present in the environment. The environmental privacy level may be classified as public when one or more people are present in the environment and are not known to have access to a data store from which information in the communication originated.

Environmental privacy level may be classified as friendly when all individuals in the environment are known and have access to the information in the communication. Each of these categories may be defined by a range of scores generated by a machine learning method or algorithm used to assess the environmental privacy level of an environment.

It should also be noted that a user input can be used to find environmental privacy level. For example, user settings could indicate that the environment is public or private. A personal assistant located in a conference room could be designated as in a public environment.

At step 530, a privacy context for communicating the communication is determined using both the environmental privacy level the content privacy level. The overall context of a communication can be assigned a privacy context of secure, unsecure, or uncertain.

The secure privacy context is assigned when the environmental privacy score is larger than or equal to the privacy content score, unless both scores are in the middle category. For example, when the environmental privacy score is classified as private then the privacy context will always be secure as can be seen from the right hand column of table 1. The one exception to the case is when the environmental privacy level is friendly and the content privacy level is sensitive. In this case, the two scores are equal but the environment is classified as uncertain. The privacy context is also classified as secure when the content privacy level is public because the environmental score is equal to or greater than the content score. When the privacy context is secure then the communication should be output in full on its default communication channel.

The privacy context can be classified as insecure when the content privacy level is greater than the environmental privacy level. For example, when the privacy level of the content is private and the privacy level of the environment is public or friendly. When the privacy level is insecure, then a notification is provided that content can be found on alternate communication channel.

When the privacy context is uncertain then the content is modified to remove sensitive content, as described with reference to FIG. 3C.

At step 540, a second communication channel is determined for outputting the communication to a user in response to determining the privacy context is classified as unsecure. The second communication channel is different from the default communication channel. For example, the second communication channel may comprise a communication sent to the user's phone or another user device associated with the user, and the communication may be a message (such as an SMS text message, email, in-app message, which may be provided via an app associated with the virtual assistant) or other notification.

At step 550, the communication is output to the user through the second communication channel. For example, the communication could be sent to the user's phone.

At step 560, a notification is generated for the default communication channel that directs the user to the second communication channel. Embodiments of step 560 have been described previously, for example, with reference to FIG. 3D.

At step 570, the notification is output to the user through the default communication channel.

Figure 6:
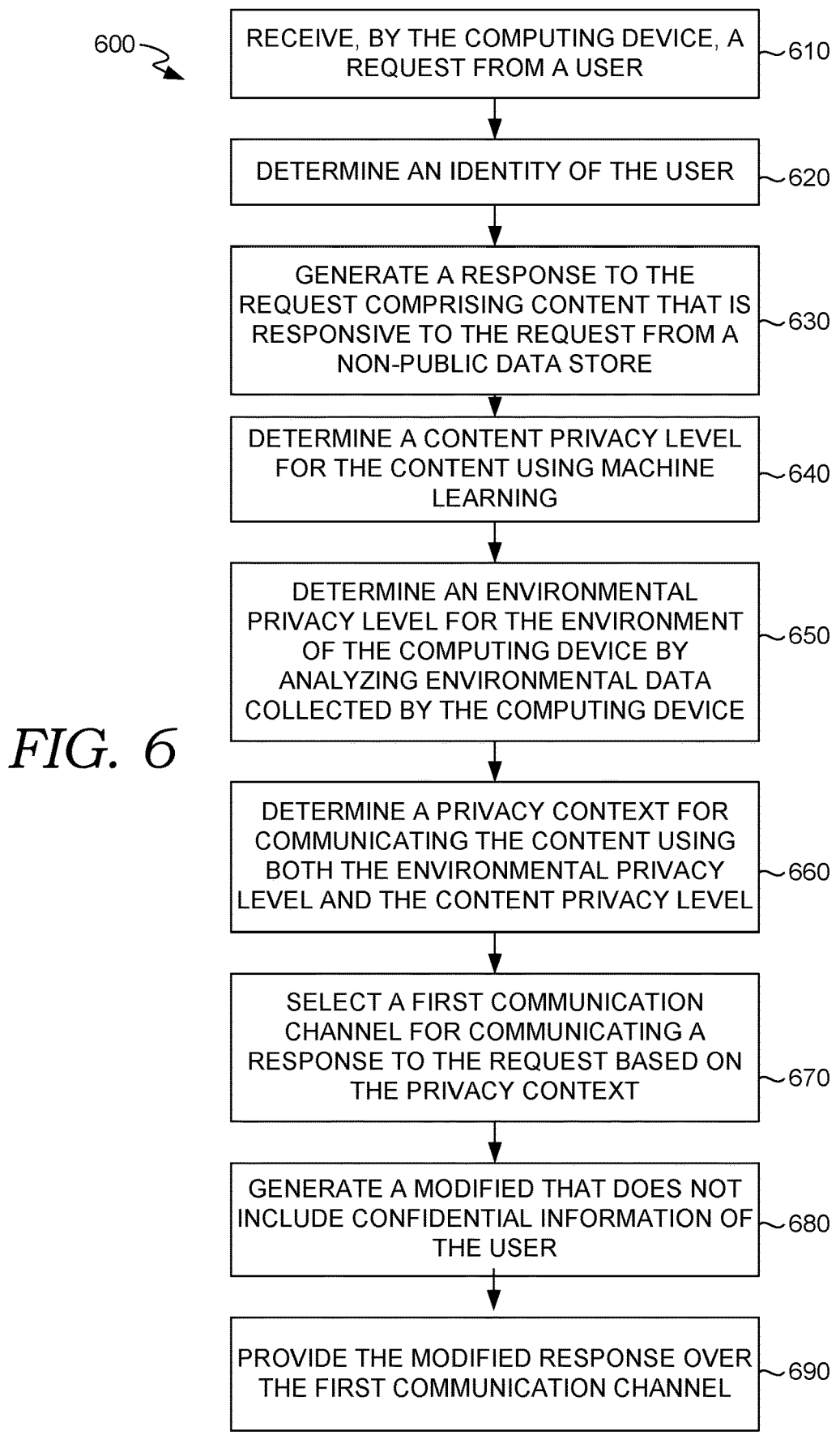

Turning now to FIG. 6, flow chart showing a method 600 for preserving privacy of information output from a computing device located in an environment is provided.

At step 610, a request from a user is receiving by the computing device, as described previously.

At step 620, an identity of the user is determined as described previously.

At step 630, a response to the request is generated from a non-public data store. The response comprises content that is responsive to the request. The non-public data store may require the user's credentials to access. Examples of a non-public data store are the user's contacts, calendars, email, social media accounts, purchase history, medical records, and the like.

At step 640, a content privacy level is determined for the content using machine learning to evaluate the content. Determining a content privacy level has been described previously with reference to FIG. 2. The content privacy level may be assigned as public, sensitive, or private. In one aspect, content is public when it originates in public sources and is not found to include keywords or a combination of language that is classified as sensitive or private. In one aspect, content is sensitive when it originates in a private data source or is classified as sensitive through natural language processing or some other mechanism. In one aspect, content is private when it originates in a private data source or is classified as private through natural language processing or some other mechanism. The content of the request can also be considered when determining the privacy level of the content.

At step 650, an environmental privacy level is determined for the environment of the computing device by analyzing environmental data collected by the computing device. The environmental privacy level may be assigned by a machine learning method. Use of different machine learning-processes are possible in different aspects, including supervised learning processes (e.g., decision tree, random forest, logistic regression), unsupervised learning (e.g., apriori algorithm, K-means), or reinforcement learning. In each case, information about the environment is used as an input to determine the environmental privacy level.

Various rules may be used to determine an input to the machine learning process were be used independently to calculate an environmental privacy level. For example, signal data may be analyzed to determine how many people are in the environment. If possible, each person in the environment may be identified through voice analysis, visual analysis, or through some other method. For example, when a meeting is scheduled to occur in a conference room the environmental privacy component 282 may assume that all invitees to the meeting are present.

The environmental privacy level may be classified as private, public, or friendly. A private environment only includes a single user associated with the personal computing device through which the communication is to be output. If the computing device is a shared device, such as a personal assistant device located in a conference room or common area, then the environment will be private only when the single person in the environment has been identified and is the addressee of the communication being evaluated.

The environmental privacy level be classified as public when one or more unknown people are present in the environment. The environmental privacy level may be classified as public when one or more people are present in the environment and are not known to have access to a data store from which information in the communication originated.

Environmental privacy level may be classified as friendly when all individuals in the environment are known and have access to the information in the communication. Each of these categories may be defined by a range of scores generated by a machine learning method or algorithm used to assess the environmental privacy level of an environment.

It should also be noted that a user input can be used to find environmental privacy level. For example, user settings could indicate that the environment is public or private. A personal assistant located in a conference room could be designated as in a public environment.

At step 660, a privacy context for communicating the content is determined using both the environmental privacy level the content privacy level. The overall context of a communication can be assigned a privacy context of secure, unsecure, or uncertain.

The secure privacy context is assigned when the environmental privacy score is larger than or equal to the privacy content score, unless both scores are in the middle category. For example, when the environmental privacy score is classified as private then the privacy context will always be secure as can be seen from the right hand column of table 1. The one exception to the case is when the environmental privacy level is friendly and the content privacy level is sensitive. In this case, the two scores are equal but the environment is classified as uncertain. The privacy context is also classified as secure when the content privacy level is public because the environmental score is equal to or greater than the content score. When the privacy context is secure then the communication should be output in full on its default communication channel.

The privacy context can be classified as insecure when the content privacy level is greater than the environmental privacy level. For example, when the privacy level of the content is private and the privacy level of the environment is public or friendly. When the privacy level is insecure, then a notification is provided that content can be found on alternate communication channel.

When the privacy context is uncertain then the content is modified to remove sensitive content, as described with reference to FIG. 3C.

At step 670, a first communication channel is selected for communicating the response to the request based on the privacy context. Selection of communication channels has been described previously.

At step 680, a modified response is generated that does not include confidential information that was in the content. The response may be modified by redacting confidential information from the content. Alternatively, a generic response may be provided. For example, in the meeting context, the response could be based on calendar information made available to others through a meeting availability interface. In this case, the response could be, "you are busy from 2 to 4 today," or "you are in a meeting with five others from 2 to 4 today." In one aspect, the modified response is a question seeking confirmation, such as, "Other people may be present, do you still want me to answer?"

At step 690, the modified response is provided over the first communication channel.

Figure 7:
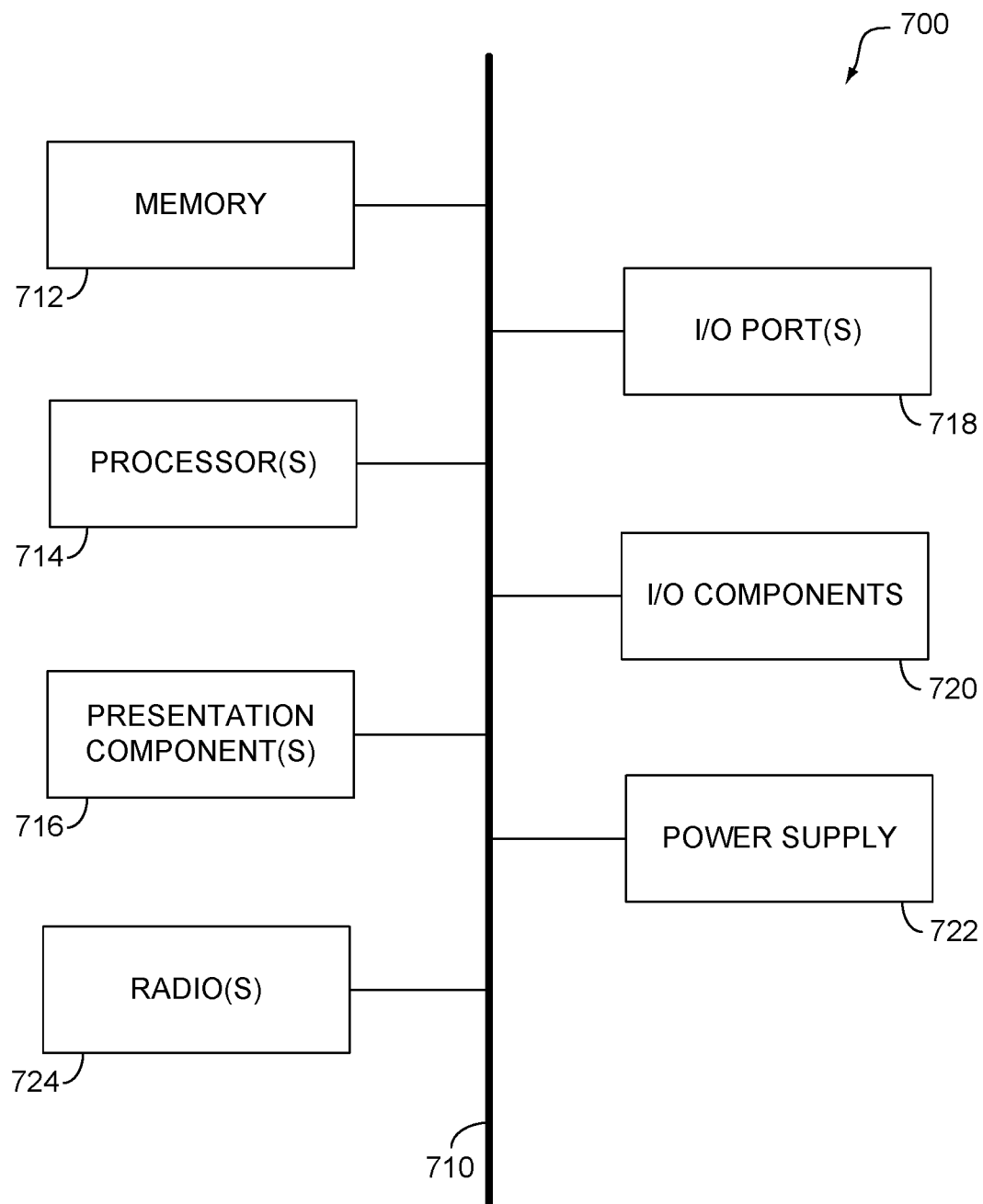
FIG. 7 is a block diagram of an exemplary computing environment suitable for use in implementing an aspect of the technology.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the present technology. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc.

The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some aspects of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method for preserving privacy of information output from a computing device located in an environment, comprising:
   receiving, by the computing device, a request from a user;
   determining an identity of the user;
   generating a response to the request comprising a content that is responsive to the request based on the identity of the user, the content retrieved from a data store;
   determining a content privacy level for the content, using machine learning, based at least in part on a determination of whether the data store is a public data store or a non-public data store;
   determining an environmental privacy level for the environment of the computing device;
   determining a privacy context for communicating the content using both the environmental privacy level and the content privacy level;
   selecting a first communication channel for responding to the request based on the privacy context;
   generating a modified response by redacting confidential information from the content;
   providing the modified response over the first communication channel.

2. The method of claim 1, wherein the modified response indicates that additional information responsive to the request has been provided over a second communication channel.

3. The method of claim 1, wherein the environmental privacy level is determined to be public, friendly, or private, and wherein the content privacy level is determined to be public, sensitive, or private.

4. The method of claim 3, wherein the privacy context is determined to be secure when the environmental privacy level is equal to or exceeds the content privacy level and the privacy context is determined to be unsecure when the content privacy level exceeds the environmental privacy level.

5. The method of claim 3, wherein the privacy context is determined to be at risk when the environmental privacy level is friendly and the content privacy level is sensitive.

6. The method of claim 1, wherein generating the modified response further comprises:
   determining a generalized descriptor that characterizes at least a portion of the confidential information; and
   altering the response by replacing the confidential information with the generalized descriptor.

7. The method of claim 1, wherein determining the environmental privacy level comprises determining that at least a second person is physically or virtually present in the environment.

8. The method of claim 7, wherein determining the environmental privacy level further comprises determining an identity of the second person, and wherein determining the content privacy level is further based on the identity of the second person.

9. The method of claim 8, wherein the content is obtained from the non-public data store, and wherein determining the content privacy level comprises determining that the second person has access to the non-public data store.

10. One or more computer storage media having computer-usable instructions embodied thereon which, when executed by a computing device, cause the computing device to perform a method of preserving privacy of information output from the computing device located in an environment, the method comprising:
- receiving, by the computing device, a query from a user;
- determining an identity of the user;
- generating a response to the query comprising content that is responsive to the query, the content retrieved from a data store;
- determining a content privacy level for the content using machine learning to evaluate the content, wherein determining the content privacy level is based at least in part on a determination of whether the data store is a public data store or a non-public data store;
- determining an environmental privacy level for the environment of the computing device by analyzing environmental data collected by the computing device;
- determining a privacy context for communicating the content using both the environmental privacy level and the content privacy level;
- selecting a first communication channel comprising an output from the computing device for responding to the query based on the privacy context;
- generating a modified response that does not include confidential information; and
- providing the modified response over the first communication channel.

11. The media of claim 10, wherein the modified response indicates that additional information responsive to the query has been provided over a second communication channel.

12. The media of claim 10, wherein the privacy context is determined to be secure when the environmental privacy level is equal to or exceeds the content privacy level and the privacy context is determined to be unsecure when the content privacy level exceeds the environmental privacy level.

13. The media of claim 10, wherein generating the modified response further comprises:
- determining a generalized descriptor that characterizes at least a portion of the confidential information; and
- altering the response by replacing the confidential information with the generalized descriptor.

14. The media of claim 10, wherein determining the environmental privacy level comprises determining that at least a second person is physically or virtually present in the environment and determining an identity of the second person, and wherein when the data store is determined to be the non-public data store, determining the content privacy level is further based on determining that the second person has access to the non-public data store.

15. A system for preserving privacy of information output from a computing device located in an environment, the system comprising:
- at least one processor;
- at least one computer storage medium having computer-usable instructions embodied thereon which, when executed by the computing device, cause the computing device to perform a method comprising:
  - receiving, by the computing device, a query from a user;
  - determining an identity of the user;
  - generating a response to the query comprising content that is responsive to the query, the content retrieved from a data store;
  - determining a content privacy level for the content using machine learning to evaluate the content, wherein determining the content privacy level is based at least in part on a determination of whether the data store is a public data store or a non-public data store;
  - determining an environmental privacy level for the environment of the computing device by analyzing environmental data collected by the computing device;
  - determining a privacy context for communicating the content using both the environmental privacy level and the content privacy level;
  - selecting a first communication channel comprising an output from the computing device for responding to the query based on the privacy context;
  - generating a modified response that does not include confidential information; and
  - providing the modified response over the first communication channel.

16. The system of claim 15, wherein the modified response indicates that additional information responsive to the query has been provided over a second communication channel.

17. The system of claim 15, wherein the privacy context is determined to be secure when the environmental privacy level is equal to or exceeds the content privacy level and the privacy context is determined to be unsecure when the content privacy level exceeds the environmental privacy level.

18. The system of claim 15, wherein generating the modified response further comprises:
- determining a generalized descriptor that characterizes at least a portion of the confidential information; and
- altering the response by replacing the confidential information with the generalized descriptor.

19. The system of claim 15, wherein determining the environmental privacy level comprises determining that at least a second person is physically or virtually present in the environment and determining an identity of the second person.

20. The system of claim 19, wherein when the data store is determined to be the non-public data store, determining the content privacy level is further based on determining that the second person has access to the non-public data store.

* * * * *